United States Patent
Kuwabara et al.

(10) Patent No.: US 7,756,293 B2
(45) Date of Patent: Jul. 13, 2010

(54) MOVEMENT CAPTURE AND ANALYSIS APPARATUS AND METHOD

(75) Inventors: Takahiko Kuwabara, Kanagawa (JP); Hitoshi Ikeda, Kanagawa (JP); Noriji Kato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 761 days.

(21) Appl. No.: 11/224,925

(22) Filed: Sep. 14, 2005

(65) Prior Publication Data
US 2006/0098846 A1 May 11, 2006

(30) Foreign Application Priority Data

Nov. 5, 2004 (JP) ............................. 2004-322699
Jun. 13, 2005 (JP) ............................. 2005-172192

(51) Int. Cl.
*G06K 9/00* (2006.01)
(52) U.S. Cl. ...................................................... 382/103
(58) Field of Classification Search ................. 382/100, 382/103, 106, 107, 128, 162, 164, 165; 348/169–172
See application file for complete search history.

(56) References Cited

U.S. PATENT DOCUMENTS 6,215,890 B1 * 4/2001 Matsuo et al. ............... 382/103
6,256,400 B1 * 7/2001 Takata et al. ................ 382/103

FOREIGN PATENT DOCUMENTS

JP    A-08-320920    12/1996

* cited by examiner

*Primary Examiner*—Samir A. Ahmed
*Assistant Examiner*—Atiba O Fitzpatrick
(74) *Attorney, Agent, or Firm*—Oliff & Berridge, PLC

(57) ABSTRACT

A movement analysis apparatus includes: a data acquiring unit that acquires moving image data including a series of image data obtained by photographing a human body; a storing unit that stores target range designating information that designates, within the image data, a moving range of a predetermined part of the human body; a detecting unit that designates, for each set of image data included in the obtained moving image data, a plurality of image areas that correspond to the moving range of the predetermined part of the human body that is designated by the target range designating information, and detects, from the plurality of designated image areas, an image area including the predetermined part of the human body; and an output unit that outputs information representing the results detected by the detecting unit.

22 Claims, 5 Drawing Sheets

| AREA SEGMENT SPECIFYING INFORMATION | R1 | R2 | R3 |
|---|---|---|---|
| | 10 | 20 | 7 |
| | 7 | 18 | 6 |
| | 8 | 21 | 5 |
| ⋮ | ⋮ | ⋮ | ⋮ |

FIG. 6

| NAME | DATE | PICK UP R1 (sec) | MOVE R2 (sec) | DEPOSIT R3 (sec) | SPEED (cm/sec) | HAND POSITION INFORMATION |
|---|---|---|---|---|---|---|
| A | XX/XX/XX | 7 | 20 | 4 | 0.50 | (10, 20), (20, 30), ... |
|   | XX/XX/XX | 8 | 18 | 4 | 0.56 | (10, 21), (21, 31), ... |
|   | ... | ... | ... | ... | ... | ... |
| B | XX/XX/XX | 15 | 22 | 3 | 0.45 | (11, 22), (31, 21), ... |
|   | ... | ... | ... | ... | ... | ... |

N / D / E / R

MOVEMENT CAPTURE AND ANALYSIS APPARATUS AND METHOD

BACKGROUND OF THE INVENTION

1. Field of the Invention

The present invention relates to a movement analysis apparatus that outputs information related to the movement and posture of an object such as a person based on an image data.

2. Description of the Related Art

As apparatuses that employ obtained image data to identify the posture of a person as an object, apparatuses that employ the relative positional relation of hands and shoulders have been developed (e.g., JP-A-8-320920). Since it is extremely difficult that objects, such as hands, that have a large degree of freedom for bending are identified based on pattern recognition, the colors of the objects are employed for the recognition.

By using colors, however, erroneous recognition tends to occur when an object similar to a skin color is present near the hands. Further, in a case where recording the hand of a person who is basically repeating a predesignated movement, the search range for moving image data is too wide due to the large degree of freedom for the movement of the hand. Therefore, it is difficult to improve the processing efficiency.

SUMMARY OF THE INVENTION

While taking these problems into account, one of objects of the present invention is to provide a movement analysis apparatus that can reduce the occurrence of erroneous recognition, and that can increase the processing efficiency.

According to one aspect of the invention, there is provided a movement analysis apparatus including: a data acquiring unit that acquires moving image data including a series of image data obtained by photographing a human body; a storing unit that stores target range designating information that designates, within the image data, a moving range of a predetermined part of the human body; a detecting unit that designates, for each set of image data included in the obtained moving image data, a plurality of image areas that correspond to the moving range of the predetermined part of the human body that is designated by the target range designating information, and detects, from the plurality of designated image areas, an image area including the predetermined part of the human body; and an output unit that outputs information representing the results detected by the detecting unit.

BRIEF DESCRIPTION OF THE DRAWINGS

The above objects and advantages of the present invention will become more apparent by describing in detail of a preferred embodiment thereof with reference to the accompanying drawings, wherein:

FIG. 6 is an explanatory diagram showing an example record of movement analysis results according to the embodiment.

DETAILED DESCRIPTION OF THE INVENTION

Figure 1:
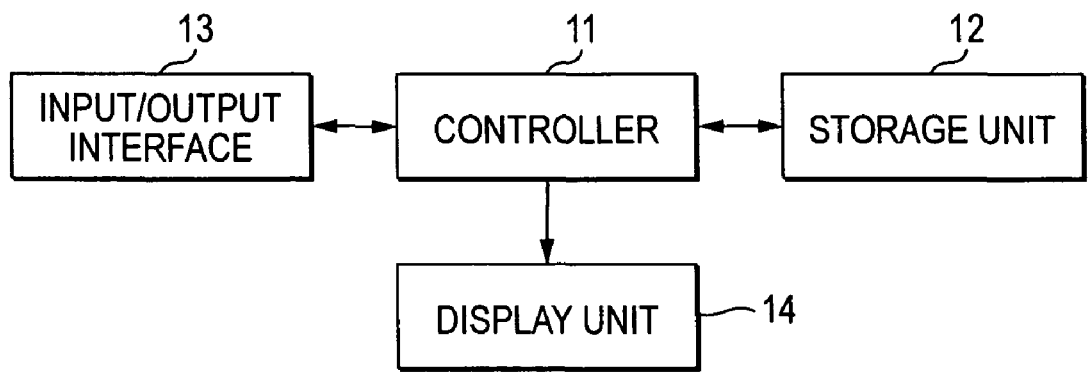
FIG. 1 is a block diagram showing the configuration of a movement analysis apparatus according to an embodiment of the present invention.

Referring to the drawings, an explanation will be given of an embodiment of the invention.

A movement analysis apparatus according to the embodiment employs externally input moving image data to recognize the location of a predetermined part of a human body. In the embodiment, the position of a "hand" is recognized as the predetermined part. Specifically, as is shown in FIG. 1, the movement analysis apparatus of the embodiment includes: a controller 11, a storage unit 12, an input/output interface 13 and a display unit 14. The moving image data are obtained by a pickup unit, such as a CCD camera, or a video player that is connected to the input/output interface 13. The moving image data includes a series of stationary still image frames that are obtained by photographing a person. Each of the still image frames corresponds to an image data, in the embodiment. Frame numbers are provided in the time-series order beginning from "1" for the individual still image frames.

The controller 11 is operated in accordance with a program stored in the storage unit 12, and basically performs, for each still image frame in a series included in the externally input moving image data, a process (face identifying process) for identifying the image of a face, a process (hand identifying process) for identifying the image of a hand, and a movement identifying process for identifying the movement of a person that is an object based on the information of the relative positions of the face and the hand identified through these processes. The specific procedure of these processes will be described later.

The storage unit 12 is a computer-readable recording medium used to store a program to be executed by the controller 11. The storage unit 12 is also used as a work memory in which various data required for the processing by the controller 11 are stored. In the embodiment, target range designating information that designates a moving range of the predetermined part of a human body is stored in advance in the storage unit 12 by a user.

Figure 2:
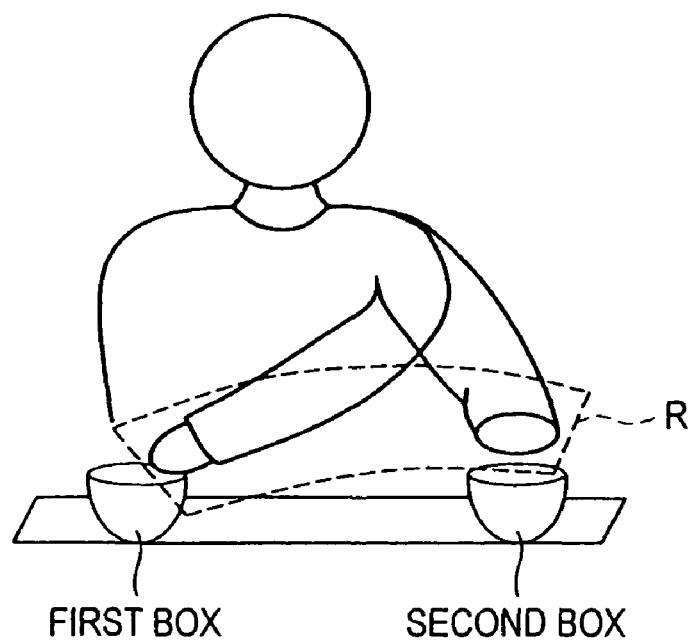
FIG. 2 is a diagram for explaining an example moving range designated by using target range designating information.

Since the movement analysis apparatus in the embodiment is to recognize the position of the hand, the target range designating information that designates the moving available range of the hand for input moving image data is to be entered. In order to easily understand the following explanation, the moving image data are those obtained by photographing a person that picked up peas from a first box and moved them to a second box over and over (FIG. 2). In this case, the target range designating information covers an arched area R that indicates the vicinity of the moving trajectory along which the hand is assumed to be moved. The area R can be defined by using the position coordinates relative to the position of the face of the person. Specifically, the X-Y Cartesian coordinates are designated while the center point of the area recognized as the face of the person is employed as the origin, and the area R is defined by using the coordinate values along the Cartesian coordinates.

As is shown in FIG. 1, the input/output interface 13, which is connected to an external device, such as a camera, obtains image data from the external device and outputs the image data to the controller 11. Furthermore, in accordance with an instruction received from the controller 11, the input/output interface 13 outputs various data to the external device. The display unit 14 is, for example, a display device, and displays information in accordance with an instruction received from the controller 11.

Figure 3:
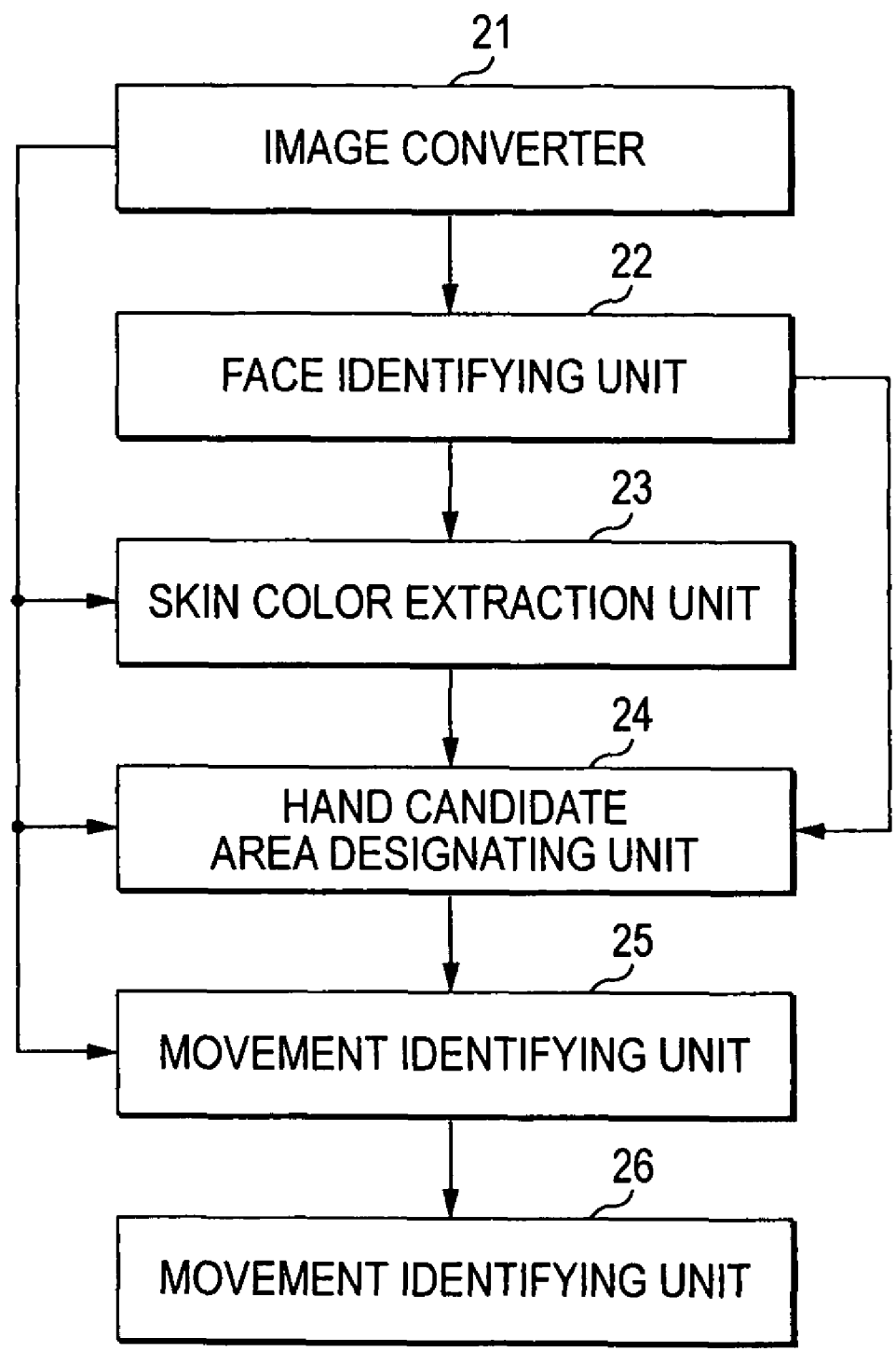
FIG. 3 is a functional block diagram showing the movement analysis apparatus according to the embodiment of the present invention.

As is shown in FIG. 3, the function of the program executed by the controller 11 includes: an image converter 21; a face identifying unit 22; a skin color extraction unit 23; a hand candidate area designating unit 24; a hand identifying unit 25; and a movement identifying unit 26. The image converter 21 converts, into image data of gray scale (gray scale data), image data that are obtained through the input/output interface 13 and are to be processed, and outputs the gray scale image data to the face identifying unit 22. The image converter 21 is also converts the image data to be processed into image data (hue data) of a hue image, and outputs the hue data to the skin color extraction unit 23, the hand candidate area designating area designating unit 24 and the hand identifying unit 25.

The face identifying unit 22 identifies the portion of a face based on the gray scale data received from the image converter 21. As will be described later, the face identifying unit 22 need only identifying the face portion within image data based on data that are obtained in advance through learning. Further, the face identifying unit 22 may be able to identify not only the position of the face, but also the direction (three-dimensional direction) of the face and the size of the face (such a face identifying process will also be described later).

The skin color extraction unit 23 extracts, from hue data received from the image converter 21, the partial image for an area that corresponds to the face identified by the face identifying unit 22, calculates and outputs the average hue data for the partial image. Specifically, the skin color extraction unit 23 employs outputs, skin color information, a histogram for pixel values of the hue data that are included in an area that is defined by the area information that is output by the face identifying unit 22. The skin color information is a histogram for the color of a face (i.e., the skin color of the face) identified by the face identifying unit 22, or in a way, the skin color information inherent to the person. In the embodiment, the skin color inherent to an object is extracted, and is employed to identify the hand portion. It should be noted that the hues are employed for comparison because it is taken into account that the lightness of the skin color for the face and the hands has been changed due to, for example, sunburn.

The hand candidate area designating unit 24 employs the target range identifying information, stored in the storage unit 12, and information of the position of the face, received from the face identifying unit 22, to output at least one candidate area where it is assumed the hand of the person is included. Specifically, the hand candidate area designating unit 24 divides, into a plurality of segments, an area designated by the target range designating information, and outputs, as hand candidate areas, sets of information that represent those obtained segments (when the segments are rectangles, the sets of information are the coordinates of vertexes on the diagonal lines of the rectangles).

The hand identifying unit 25 performs the following processing for the hue data received from the image converter 21, while regarding, as the areas for starting the hand search (search start area), areas that correspond to a plurality of hand candidate areas that are output by the hand candidate designating unit 24.

For each of the search start areas, the hand identifying unit 25 employs the pixel value (hue value) of each pixel in the search start area and the value indicated by the skin color information output by the skin color extraction unit 23, and obtains, out of the portion of the hue data included in the search start area, the centroid of the skin color portion that is output by the skin color extraction unit 23. That is, among pixels included in the search start area, a search is performed to find a pixel such that a difference between the pixel value and a pixel value that corresponds to skin color information output by the skin color extraction unit 23 falls within a predesignated range. When N pixels are found through the search, and the positions of these N pixels are (xi, yi), the coordinates (x, y) of the centroid can be obtained as S(xi, yi)/n. In the portion of the hue data included in the search start area, there are no such pixels that a difference from a pixel value that corresponds to the skin color information output by the skin color extraction unit 23 does not fall within the predesignated range, it is determined that the hand is not included in the pertinent search start area, and the search in the search start area may be halted.

The hand identifying unit 25 defines a new search area with the centroid. This search area should be in the same size and in the same shape as the search start area. Hereinafter, in the newly defined search area, the process for obtaining the centroid of the skin color portion and the process for moving the search area are repetitively performed in the same manner until the distance between the new centroid and the previously obtained centroid is equal to or shorter than a predetermined value (the search area is converged). Hereinafter, the converged search area is called a converged search area. When the search area is not converged through the processing by a predetermined number of repetitions, it is determined that the hand is not detected, and the processing may be terminated. In this manner, generally, a plurality of converged search areas are obtained in consonance with a plurality of search areas.

The hand identifying unit 25 compares the thus obtained converged search areas, and identifies that the area where it is assumed that the hand is present. An example comparison method is as follows. Pixels such that a difference from the pixel value that is indicated by the skin color information output by the skin color extraction unit 23 falls within the predesignated range are counted for each of the converged search area. Then, the converged search area where the count of the pixel values is the maximum is determined as an area where the hand is present. The converged search areas where the count value is equal to or greater than a predetermined value may be determined to be areas where the hand is present. In addition, when the converged search areas determined to be areas where the hand is present are in contact with each other, or overlapped with each other, these areas may be synthesized (a new area formed of the pixels included in these areas may be generated), and the resultant area may be determined to be an area where the hand is present.

The hand identifying unit 25 outputs information for designating an area determined where the hand is present (e.g., a set of the vertex coordinates of a polygon that encloses the area).

That is, through the operations of the image converter 21, the face identifying unit 22, the skin color extraction unit 23, the hand candidate area designating unit 24 and the hand identifying unit 25, the information (hand position information) for designating an area determined where the hand is present is generated for each still image frame that is included in the input moving image data.

The movement identifying unit 26 generates information related to the movement of a photographed person based on the moving state on the moving image data in the image area that is detected for each set of image data and that includes the predetermined part of the human body. Specifically, the movement identifying unit 26 employs the hand position information generated for each still image frame in a series to obtain the change of the hand position information as time elapses. Specifically, the hand position information designates a frame that represents a predetermined position. For example, assume photographing of a person who is picking up peas from the first box and moving them to the second box over and over. Also assume that predetermined positions are the position of a hand when the peas are picked up from the first box, and are placed in the second box. The movement identifying unit 26 extracts the row of frame numbers so that the predetermined numbers correspond to hand position information, and calculates the average of the intervals of the frame numbers in the row. The average value represents the period for moving peas, i.e., information related to the speed of the movement of the person, and is presented (displayed or printed) to a user.

Figures 4, 5:
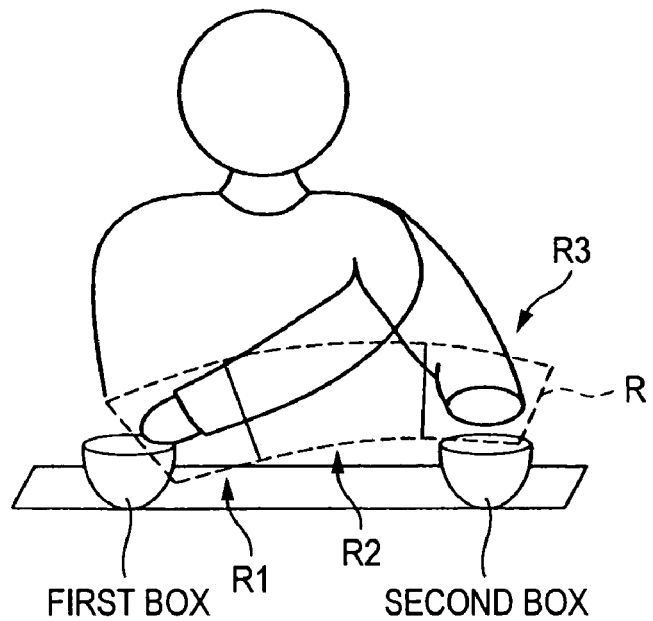
FIG. 4 is a diagram for explaining an example for setting segment areas obtained by dividing the target range designated by the target range designating information according to the embodiment.
FIG. 5 is an explanatory diagram showing example information to be employed for a process for calculating a stay period for each area segment according to the embodiment.

For example, an area R, which is target range designating information, may be divided into a plurality of area segments, and the movement of a person may be categorized dependent on which hand position information, generated for each still image frame, belongs to which area segment. As a specific example, an area segment R1, located within a predetermined distance of a first box, an area segment R3, located within a predetermined distance of a second box, and an area segment R2, located between the segments R1 and R3, are defined (FIG. 4). Then, the area segments for which hand position information, generated for the individual still image frames, is available are examined, and information used to specify the area segments for which hand position information is available is recorded in correlation with frame numbers.

Next, the movement identifying unit 26 resets the counter to "1", and scans the recorded information to obtain information (area segment specifying information) for specifying a segment area that is correlated with the first frame number. Thereafter, the movement identifying unit 26 obtains area segment specifying information by scanning the recorded information in frame number order, and compares the thus obtained area segment specifying information with area segment specifying information that had previously been obtained. When the area segment specifying information that has currently been obtained is the same that previously obtained, the counter value is incremented by "1".

When the area segment specifying information currently obtained differs from that which was previously obtained, the current counter value is stored in correlation with the area segment specifying information that was previously obtained. Then, the movement identifying unit 26 resets the counter to "1", and repeats, for the next frame number, the process employed to obtain the area segment specifying information.

In this manner, data for area segment specifying information, such that a hand is present in segment areas indicated by that information, are generated in correlation with the number of frames (FIG. 5). The movement identifying unit 26 then calculates an average value for the number of frames that are correlated with each set of area segment specifying information and stores the thus obtained average value in the storage unit 12 in correlation with each set of area segment specifying information. This average value represents the average time (the average stay period) the hand stays in each area segment. Once this has been completed, the average value is multiplied by the pickup time interval between the individual frames of moving image data to convert the number of frames into data representing the time.

In the embodiment, frames where the hand is located at predetermined positions are designated, and the average of the intervals of the designated frame numbers is employed to estimate the time required by the photographed person for the movement. Instead of this process, the traveling distance of the coordinates (e.g., the center coordinates of the area designated by the hand position information) related to the hand position information may be obtained for adjacent frames (between the k-th frame and the (k+1)th frame). The average of the intervals between the frames for which the traveling distance is "0" may be employed to estimate the time required by a photographed person for the movement.

Furthermore, a coordinate difference in hand position information between adjacent frames may be multiplied by a predetermined conversion parameter, a parameter for changing the coordinate value to a distance (e.g., the centimeter units), and the result may be divided by the pickup time interval between the individual frames of moving image data to obtain the moving speed for the hand. As the moving speed for the hand, an average moving speed may be obtained by calculating an average value for all the frames.

The movement identifying unit 26 may store the thus obtained information and the hand position information in the storage unit 12, in correlation with information obtained for the date and time.

For example, as shown in FIG. 6, the recorded contents represent a correlation of the name (N) of the person photographed, a date (D), calculated values (E), such as the average stay periods for the hand in the individual area segments and the average moving speed, and hand position information (R).

Figure 7:
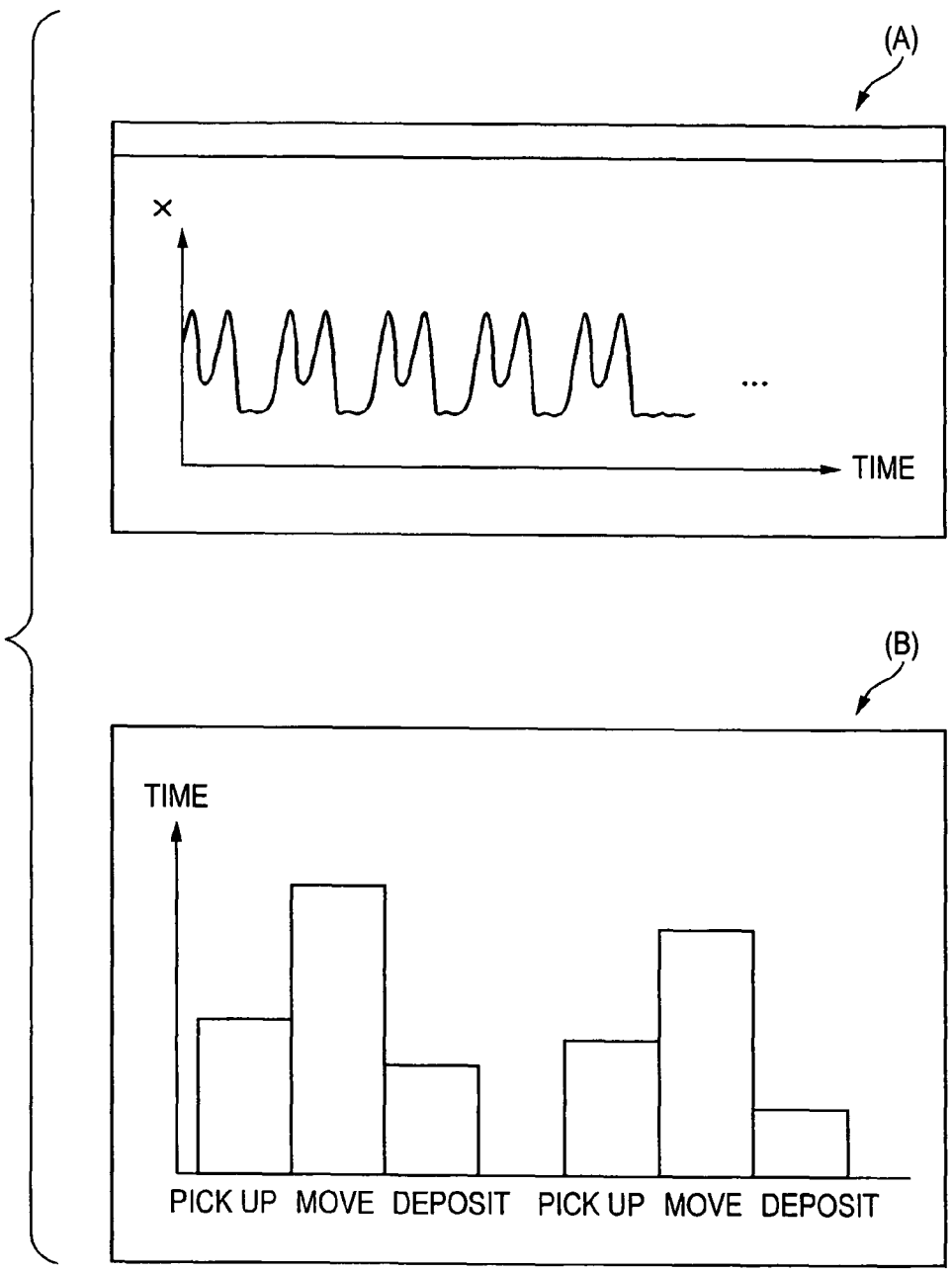
FIG. 7 is an explanatory diagram showing an example display of movement analysis results according to the embodiment.

The controller 11 may display the recorded information on the display unit 14 in response to an instruction received from a user, or may present multiple sets of recorded information for comparison. That is, calculated values, correlated with information for different dates, may be graphically represented on the display unit 14 to permit an examination of the skill level of a specific person photographed and an evaluation of an improvement level for a movement. A specific example is shown in FIG. 7. In this example, two graphs are displayed: a graph (A) showing hand position information that is correlated with one of the dates selected for display, and a graph (B) showing calculated values that are correlated with multiple dates selected for display.

In this example, the graph showing the hand position information depicts a change in the X or the Y coordinate value included in the hand position information, and the graph showing the calculated values uses bar graphs to depict average stay periods for the individual area segments. However, the presentation form types are not limited to the ones used here.

Furthermore, the controller 11 may perform a predetermined a calculation process, based on information recorded for multiple sets of moving image data related to the recorded movements, and may present the obtained calculation results. For example, the controller 11 may calculate differences between average stay periods for individual area segments that were measured, on different dates, to obtain image data for movements, and may present an improvement level for the movements.

Process for Identifying a Face

The process for identifying a face will now be described. The face identifying unit 22 converts the still image frames included in moving image data into gray scale data, and extracts from the gray scale data the portion that corresponds to the face of a person by use of a first learning database obtained through learning the faces of people. At this time, the face portion is designated by a predetermined method, and a full face, front view image (normal image) and a plurality of other images of the face turned to the right and to the left from the normal image by predetermined angles are prepared. These other face images are converted (normalized) by using a second learning database, so that the other face images are proximate to the normal image. Then, the information in the first learning database is employed to determine whether the image data obtained by the normalization are for the face image. According to this method, since the rotation angle can be determined during the normalization process, whether the image data are for the face image can be quickly determined during the normalization process, and when the rotation angle obtained in this process is output, this angle can be employed for the process using the direction of the face.

Reduction for the Processing Load

In the explanation given above, the detection of the position of the face and the extraction of the skin color have been processed for each still image frame. However, the position of the face may be detected for the first still image frame, and the skin color may be extracted based on the image of the detected face portion. Thereafter, the hand identifying unit 25 may generate hand position information by using the skin color information.

In this case, a difference between the average value of the pixel values in an area that is designated by hand position information corresponding to the k-th still image frame and the average value of the pixel values in an area that is designated by hand position information that corresponds to the adjacent (k+1)-th still image frame may be calculated, and the skin color information that is to be provided for the process for identifying the hand position information for the (k+2)-th still image frame may be corrected. That is, a change of the average value of the pixel values related to the hue is multiplied by a predetermined weight, and for the correction, the product is added to the skin color information value that is sued for the process for identifying the hand position information for the (k+1)-th still image frame. As a result, the position of the hand can be more accurately identified.

As is described above, according to the embodiment, the moving range of the target portion to be recognized, such as a hand, is designated in advance as moving image data, and the target portion is detected in the designated moving range. As a result, the occurrence of the erroneous recognition can be reduced, and the processing efficiency can be increased.

According to a first aspect of the invention, there is provided a movement analysis apparatus including: a data acquiring unit that acquires moving image data including a series of image data obtained by photographing a human body; a storing unit that stores target range designating information that designates, within the image data, a moving range of a predetermined part of the human body; a detecting unit that designates, for each set of image data included in the obtained moving image data, a plurality of image areas that correspond to the moving range of the predetermined part of the human body that is designated by the target range designating information, and detects, from the plurality of designated image areas, an image area including the predetermined part of the human body; and an output unit that outputs information representing the results detected by the detecting unit.

The information for defining the moving range is designated in advance for the predetermined part of the person that is a target to be recognized, and the area related to the moving range is defined as the search area. As a result, the occurrence of erroneous recognition can be reduced, and the processing efficiency can be improved.

The detecting unit of the movement analysis apparatus may employ a color of the predetermined part of the human body to detect an image area including the predetermined part of the human body from the plurality of image areas.

The movement analysis apparatus may further include a recording unit that records the detection results, and may perform a process for providing, together with the detection results, information recorded for a plurality of sets of moving image data, or computation results obtained based on information recorded for a plurality of sets of moving image data.

According to a second aspect of the invention, there is provided a movement identification method for causing a computer system to execute procedures, including: acquiring moving image data including a series of image data obtained by photographing a human body; storing target range designating information that designates, within the image data, a moving range of a predetermined part of the human body; designating, for each set of image data included in the obtained moving image data, a plurality of image areas that correspond to the moving range of the predetermined part of the human body that is designated by the target range designating information; detecting, from the plurality of designated image areas, an image area including the predetermined part of the human body; and outputting information representing the results detected by the detecting unit.

According to a third aspect of the invention, there is provided a computer-readable program product for causing a computer system to execute procedures, including: acquiring moving image data including a series of image data obtained by photographing a human body; storing target range designating information that designates, within the image data, a moving range of a predetermined part of the human body; designating, for each set of image data included in the obtained moving image data, a plurality of image areas that correspond to the moving range of the predetermined part of the human body that is designated by the target range designating information; detecting, from the plurality of designated image areas, an image area including the predetermined part of the human body; and outputting information representing the results detected by the detecting unit.

According to a fourth aspect of the invention, there is provided a movement analysis apparatus including: a data acquiring unit that acquires moving image data including a series of image data obtained by photographing a human body; a storing unit that stores target range designating information that designates, within the image data, a moving range of a predetermined part of the human body; a detecting unit that designates, for each set of image data included in the obtained moving image data, a plurality of image areas that correspond to the moving range of the predetermined part of the human body that is designated by the target range designating information, and detects, from the plurality of designated image areas, an image area including the predetermined part of the human body; and an information generating unit that generates information related to a movement of the photographed human body based on a moving state on the moving image data in the image area that is detected for each set of the image data and that includes the predetermined part of the human body.

Although the present invention has been shown and described with reference to the embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A movement analysis apparatus comprising:
a data acquiring unit that acquires moving image data including a series of image data obtained by photographing an environment that includes a human body;
a storing unit that stores target range designating information that designates a moving range of a predetermined part of the human body, wherein the moving range is a partial area of the moving image data;
a detecting unit that designates, for each piece of still image data included in the obtained moving image data, a plurality of image areas designated by the moving range of the predetermined part of the human body, and detects, only from the plurality of designated image areas, an image area including the predetermined part of the human body for the each piece of still image data included in the obtained moving image data;
a recording unit that records results of the detection performed by the detecting unit;
a providing unit that provides at least one of the results of the detection recorded in the recording unit for a plurality of sets of moving image data;
a computation section that calculates a time during which the predetermined part of the human body stays in the image area in which the predetermined part of the human body was detected and calculates a difference between the calculated time and a time which was calculated in past; and
an output unit that outputs the calculated difference.

2. The movement analysis apparatus according to claim 1, wherein the detecting unit employs a color of the predetermined part of the human body to detect an image area including the predetermined part of the human body from the plurality of image areas.

3. A movement identification method comprising:
acquiring moving image data including a series of image data obtained by photographing an environment that includes a human body;
storing target range designating information that designates a moving range of a predetermined part of the human body, wherein the moving range is a partial area of the moving image data;
designating, for each piece of still image data included in the obtained moving image data, a plurality of image areas designated by the moving range of the predetermined part of the human body;
detecting, only from the plurality of designated image areas, an image area including the predetermined part of the human body for the each piece of still image data included in the obtained moving image data;
recording results of the detection performed by the detecting step;
providing at least one of the results of the detection recorded in the recording step for a plurality of sets of moving image data;
calculating a time during which the predetermined part of the human body stays in the image area in which the predetermined part of the human body was detected and calculates a difference between the calculated time and a time which was calculated in past; and
outputting the calculated difference, wherein a processor performs the above steps.

4. A non-transitory computer-readable medium storing a program for causing a computer system to execute procedures, the procedures comprising:
acquiring moving image data including a series of image data obtained by photographing an environment that includes a human body;
storing target range designating information that designates a moving range of a predetermined part of the human body, wherein the moving range is a partial area of the moving image data;
designating, for each piece of still image data included in the obtained moving image data, a plurality of image areas designated by the moving range of the predetermined part of the human body;
detecting, only from the plurality of designated image areas, an image area including the predetermined part of the human body for the each piece of still image data included in the obtained moving image data;
recording results of the detection performed by the detecting step;
providing at least one of the results of the detection recorded in the recording step for a plurality of sets of moving image data;
calculating a time during which the predetermined part of the human body stays in the image area in which the predetermined part of the human body was detected and calculates a difference between the calculated time and a time which was calculated in past; and
outputting the calculated difference.

5. A movement analysis apparatus comprising:
a data acquiring unit that acquires moving image data including a series of image data obtained by photographing an environment that includes a human body;
a storing unit that stores target range designating information that designates a moving range of a predetermined part of the human body, wherein the moving range is a partial area of the moving image data;
a detecting unit that designates, for each piece of still image data included in the obtained moving image data, a plurality of image areas designated by the moving range of the predetermined part of the human body, and detects, only from the plurality of designated image areas, an image area including the predetermined part of the human body for the each piece of still image data included in the obtained moving image data;
an information generating unit that generates information related to a movement of the photographed human body based on a moving state on the moving image data in the image area that is detected for each set of the image data and that includes the predetermined part of the human body;
a recording unit that records results of the detection performed by the detecting unit;
a providing unit that provides at least one of the results of the detection recorded in the recording unit for a plurality of sets of moving image data;
a computation section that calculates a time during which the predetermined part of the human body stays in the image area in which the predetermined part of the human body was detected and calculates a difference between the calculated time and a time which was calculated in past; and
an output unit that outputs the calculated difference.

6. The movement analysis apparatus according to claim 5, wherein the information generating unit generates the information including information related to the speed of the movement.

7. The movement analysis apparatus according to claim 1, wherein the results are output as statistical results based on the acquired image data.

8. The movement identification method according to claim 3, wherein the results are output as statistical results based on the acquired image data.

9. The non-transitory computer-readable medium according to claim 4, wherein the results are output as statistical results based on the acquired image data.

10. The movement analysis apparatus according to claim 5, wherein the information generating unit generates the information including information related to statistical results based on the acquired image data.

11. The movement analysis apparatus according to claim 1, wherein the predetermined part of the human body is designated by calculating a centroid of a set of pixels for each image area that falls within a preset designated range.

12. The movement identification method according to claim 3, wherein the predetermined part of the human body is designated by calculating a centroid of a set of pixels for each image area that falls within a preset designated range.

13. The non-transitory computer-readable medium according to claim 4, wherein the predetermined part of the human body is designated by calculating a centroid of a set of pixels for each image area that falls within a preset designated range.

14. The movement analysis apparatus according to claim 5, wherein the predetermined part of the human body is designated by calculating a centroid of a set of pixels for each image area that falls within a preset designated range.

15. The movement analysis apparatus according to claim 1, wherein the output unit outputs information indicating an improvement degree of a movement of the predetermined part of the human body based on the calculated difference.

16. The movement analysis apparatus according to claim 1, wherein the output unit calculates the time during which the predetermined part of the human body stays in the image area in which the predetermined part of the human body was detected by calculating an average of times during each of which the predetermined part of the human body stays in the image area from which the predetermined part of the human body was detected.

17. The movement identification method according to claim 3, wherein the outputting step outputs information indicating an improvement degree of a movement of the predetermined part of the human body based on the calculated difference.

18. The movement identification method according to claim 3, wherein the outputting step calculates the time during which the predetermined part of the human body stays in the image area in which the predetermined part of the human body was detected by calculating an average of times during each of which the predetermined part of the human body stays in the image area from which the predetermined part of the human body was detected.

19. The non-transitory computer-readable medium according to claim 4, wherein the outputting step outputs information indicating an improvement degree of a movement of the predetermined part of the human body based on the calculated difference.

20. The non-transitory computer-readable medium according to claim 4, wherein the outputting step calculates the time during which the predetermined part of the human body stays in the image area in which the predetermined part of the human body was detected by calculating an average of times during each of which the predetermined part of the human body stays in the image area from which the predetermined part of the human body was detected.

21. The movement analysis apparatus according to claim 5, wherein the output unit outputs information indicating an improvement degree of a movement of the predetermined part of the human body based on the calculated difference.

22. The movement analysis apparatus according to claim 5, wherein the output unit calculates the time during which the predetermined part of the human body stays in the image area in which the predetermined part of the human body was detected by calculating an average of times during each of which the predetermined part of the human body stays in the image area from which the predetermined part of the human body was detected.

\* \* \* \* \*